April 5, 1966  W. F. ALTENPOHL, JR  3,243,840
LEG AND NECK RETAINING POULTRY SHACKLE Filed March 24, 1964   2 Sheets-Sheet 1

William F. Altenpohl, Jr.
INVENTOR.

BY
Attorneys

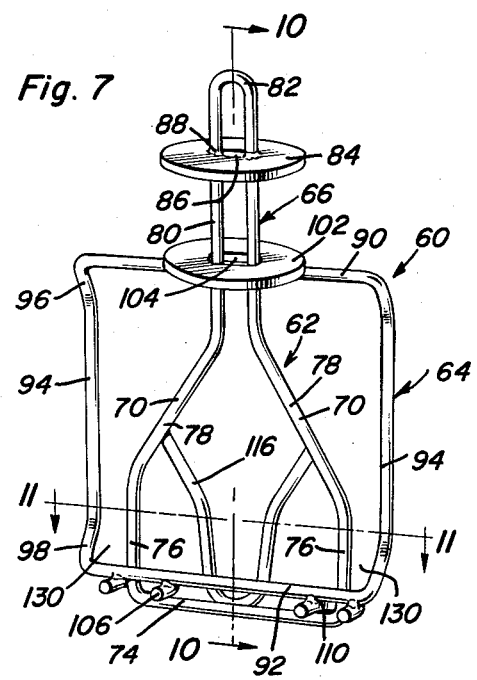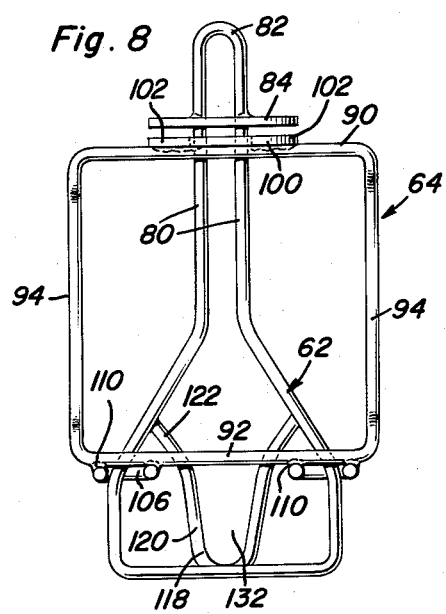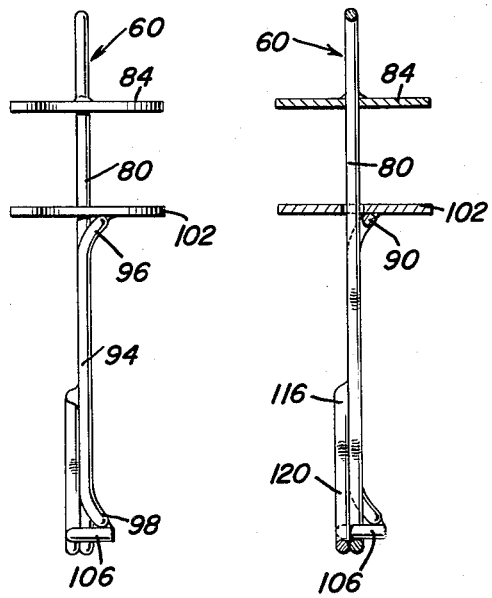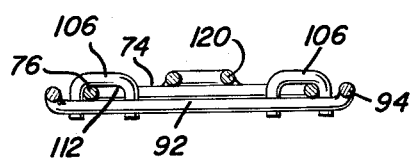

United States Patent Office 3,243,840
Patented Apr. 5, 1966

3,243,840
LEG AND NECK RETAINING POULTRY
SHACKLE
William F. Altenpohl, Jr., West Conshohocken, Pa., assignor to W. F. Altenpohl, Inc., a corporation of Pennsylvania
Filed Mar. 24, 1964, Ser. No. 354,415
10 Claims. (Cl. 17—44.1)

This application is a continuation-in-part of my prior application, Serial No. 137,814 filed September 13, 1961, now Patent No. 3,132,373 for Poultry Shackle for Overhead Conveyor and Carriage Assembly and contains subject matter which is common to that of my above-identified application together with additional subject matter which constitutes an improvement thereover and a modification thereof.

This invention comprises a novel and useful leg and neck retaining poultry shackle and more particularly pertains to a shackle adapted for use with an overhead type of poultry conveyor system and which provides a means for releasably suspending and holding the legs and neck of poultry.

This invention relates to a poultry shackle construction of an extremely simplified nature and which will effectively but releasably support the legs and/or the neck of fowls during their conveyance by an overhead conveying system for the performance of various operations upon the poultry.

A further important object of the invention is to provide a poultry shackle in accordance with the above set forth objects which shall comprise two components consisting of a support body incorporating therein a means for supporting the shackle from the overhead conveyor system and a holder relatively movably mounted upon the support body.

A further object of the invention is to provide a poultry shackle in accordance with the foregoing objects wherein each of the components consists of a hollow rod-like frame with one component being slidably and guidingly mounted upon and generally within the confines of the other component to provide a compact, sturdy and yet easily manipulatable shackle construction.

A further and more specific object of the invention is to provide a shackle construction in accordance with the foregoing objects wherein the two components are provided with cooperating guide means at both their upper and lower portions to thereby guidingly retain the two components in assembled and guided relation with respect to each other.

A still further purpose of the invention is to provide a poultry shackle in conformity with the above set forth objects wherein pockets are formed between cooperating portions of the holder and support body for the reception of the extremities of fowl and whereby upon relative movement of their components the pockets are enlarged in a manner to release the fowl extremities therefrom.

Yet another purpose of the invention is to provide a two-piece poultry shackle in accordance with the preceding objects which shall be of extremely simple construction, limiting itself to economical production, shall be easily sterilized and shall be capable of sturdy and long wearing service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the preferred form of poultry shackle in accordance with this invention with the holder and support body being shown in their poultry retaining position;

FIGURE 2 is a side elevational view of the shackle in FIGURE 1 taken from the left side thereof;

FIGURE 3 is a vertical central longitudinal sectional view taken substantially upon the plane indicated by the section line 3—3 of FIGURE 1;

FIGURE 4 is a horizontal sectional detail view taken substantially upon the plane indicated by the section line 4—4 of FIGURE 1;

FIGURE 5 is a perspective view of the support body component of the shackle;

FIGURE 6 is an elevational view similar to FIGURE 1 but upon a reduced scale and showing the components in the poultry releasing position of the shackle;

FIGURE 7 is a perspective view similar to FIGURE 1 of a modified construction of shackle with the components being shown in their poultry retaining position;

FIGURE 8 is an elevational view similar to FIGURE 7 but showing the position of parts when the components are moved to the poultry releasing position;

FIGURE 9 is an end elevational view of the shackle of FIGURE 7 taken from the left end thereof;

FIGURE 10 is a view in vertical central section through the shackle of FIGURE 7 taken substantially upon the plane indicated by the section line 10—10 of FIGURE 7; and FIGURE 11 is a horizontal sectional view taken substantially upon the plane indicated by the section line 11—11 of FIGURE 7.

Attention is now directed first to the preferred embodiment of shackle in accordance with the invention, as shown in FIGURES 1-6. The poultry shackle is designated generally by the numeral 10 and consists of two relatively movable components, these being a support body 12 together with a holder 14 which is movably mounted thereon. Each of these components preferably consists of a hollow rod-like frame of rigid construction. The two components are assembled together and are retained in a guided, sliding relation to provide relative vertical movement of the holder with respect to the support body.

Figure 1:
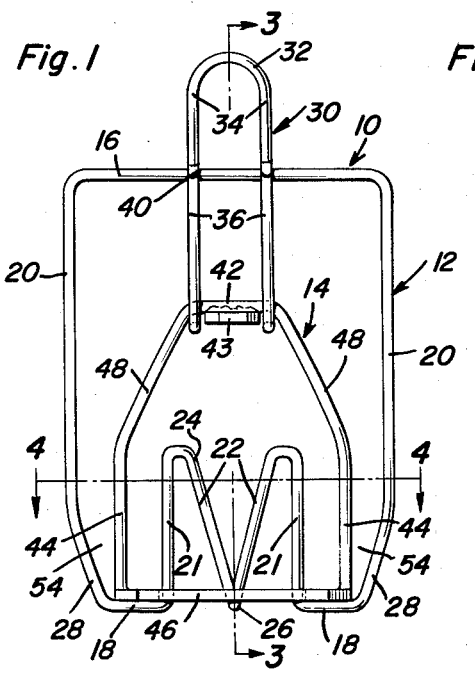
FIGURES 1-6 show a preferred embodiment of a poultry shackle in accordance with this invention while FIGURES 7-11 disclose the form of poultry shackle disclosed in FIGURES 30-34 respectively of my above-identified copending application.
Figure 2:
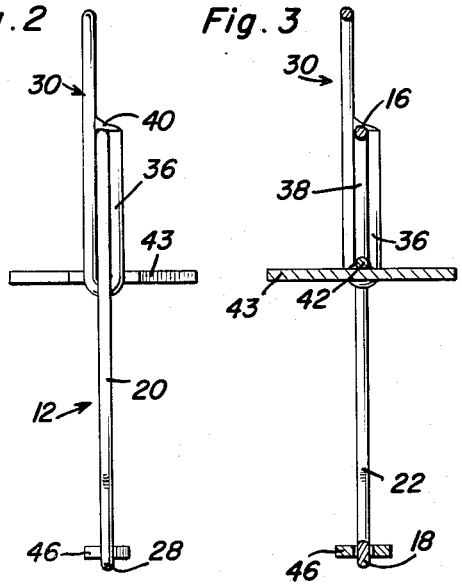
Figure 3:
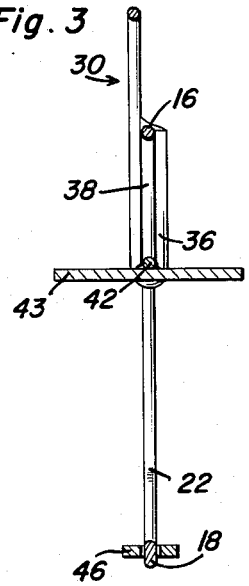
Figure 5:
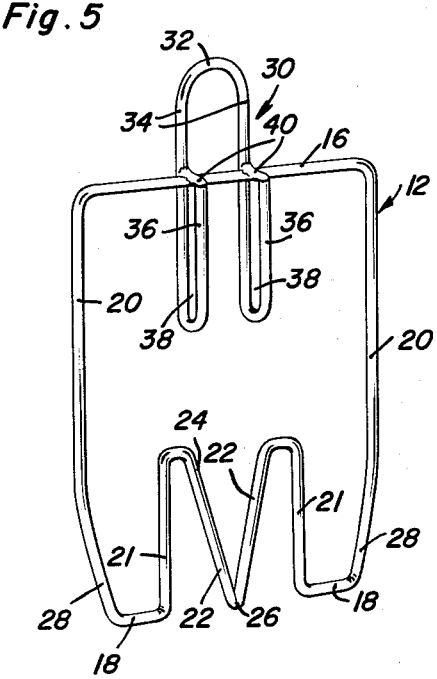
Figure 6:
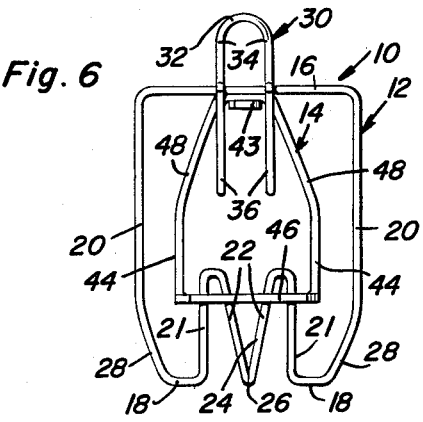

Referring primarily to FIGURES 1 and 5 it will be observed that both the holder and the support body are of a generally rectangular configuration and may be conveniently formed of a wire or rod-like material appropriately shaped and having the requisite rigidity and strength.

The support body 12 includes top and bottom members 16 and 18 together with side members 20 which latter join the extremities of the top and bottom members to provide the generally rectangular frame. It will be observed that the frame as so far described preferably consists of a single piece of rod-like material whose mid-portion comprises the above-mentioned top member 16 with portions adjacent thereto comprising the side members 20. The end portions of the rod-like element are turned toward each other to provide the bottom members 18 having perpendicular upturned portions 21 with the extremities thereof comprising downwardly projecting convergent portions 22 each indicated by the numeral 22 and which together provide a V-shaped trough or pocket 24 which is upwardly opening. At the junction of the guide portions 22 with each other, the parts are rigidly connected together as by welding as at 26. It will further be noted that the lower portion of the side members 20 are provided with relatively inclined downwardly convergent end portions at 28.

A combined handle and guide is secured to and carried by the top member 16. For this purpose a single rod-like element is provided to form the shackle support handle indicated generally by the numeral 30. The single element forming this handle component has a looped mid-portion as at 32 together with parallel arm portions 34 depending therefrom. With the loop 32 disposed above the top member 16, the arm portions project below this top member and into the interior of the frame 12. At their lower ends, the arm portions are provided with inturned portions as at 36 which are parallel to the arm portions and provide transversely aligned guide slots 38 therebetween. At their upper ends, the portions 36 together with the parallel portions 34 are fixedly secured to the top member 16 as by welding at 40.

Referring now more specifically to FIGURE 1 it will be observed that the holder component 14 likewise comprises a generally rectangular frame. This includes a horizontally disposed top member 42 from the opposite ends of which depend side members 44 whose lower portions are joined by a transversely extending bottom member 46. The lower portions of the side members 44 are preferably generally parallel with their upper portions being inclined convergingly as at 48. The top member 42 is received within the guide slots 38 so that the upper portion of the holder is retained upon and is vertically slidably guided within the handle component of the support body 12 as will be apparent from a comparison of FIGURES 1 and 6.

Figure 4:
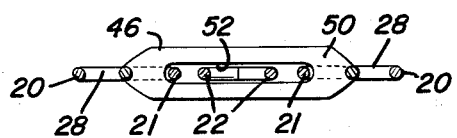

Referring now especially to FIGURE 4 it will be observed that the bottom portion 46 of the holder 14 has a laterally widened flattened plate-like mid-portion 50 which is substantially flat and is provided with an elongated slot or opening 52 therein which comprises a guide slot or opening slidingly and guidingly receiving the upstanding projections 21 and 22. The members 21 and 46 thus cooperate to provide a guide means for the lower portions of the holder and support body components 14 and 12. It will be seen that the portions 21 have a guiding action upon the opposite ends of the slot 52 throughout the entire range of movement of the component 14. It will thus be apparent that the holder 14 has its upper or top member guided upon the support handle component 30 of the support body 12 and has its lower portion guidingly engaged and retained upon the upwardly extending guide projections 22 of the bottom member of the support body. Thus, the holder is mounted within the open frame of the support body 12 and is secured thereto for guiding and sliding movement by top and bottom guide means as previously described.

Secured to the underside of the top portion 42 is a transverse plate 43 extending between the pair of members 34, 36 laterally thereof to opposite sides of the holder 14 and constituting a handle for lifting the latter relative to the support frame 12. This plate by its engagement with the members 34, 36 constitutes a further guide means for the components 12 and 14.

It will be observed that the side members 44 of the holder and the side members 20 of the support body are spaced from each other to provide pockets as at 54 therebetween. These pockets are open at their top and due to the cooperation of the straight lower portions of the side members 44 and the inclined downwardly convergent portions 28 of the side members 20 of the support body, provide a wedge-shaped pocket adapted to retain by gravity the extremity such as the legs of a fowl or the like. However, when the holder 14 is raised with respect to the support body 12, the adjacent opposed cooperating surfaces of the side members 44 and 20 will provide a pocket of increasing width therebetween thereby enabling the extremities of the fowl to be dropped by gravity from the pocket when the parts assume the position shown in FIGURE 6.

Reference is made next to the form of the invention shown in FIGURES 7–11 which comprises a species disclosed in my aforementioned Patent No. 3,132,373 (FIGS. 30–34). In this form of the invention the shackle is designated generally by the numeral 60 and likewise comprises as its two components a support body indicated generally by the numeral 62 and a holder indicated generally by the numeral 64. Each of the two components is of a hollow, rod-like frame construction with the holder component being slidably mounted upon and partially enclosing the support body component.

It will be noted that the support body 62 likewise includes a top member designated generally by the numeral 66, a pair of side members 70 and a bottom member 74. It will be noted that the bottom member 74 is a horizontal straight bar while the side members 70 are of an angulated construction consisting of lower parallel portions 76 rising from the extremities of the bottom member 74, central inwardly convergent portions 78 which extend upwardly from the portion 76, together with parallel vertical upper portions as at 80 which arise from the upper ends of the convergent portion 78 and are provided with a loop portion 82 at their upper ends. The members 78, 80 and 82 comprise the top member of the support body, with the members 82 and 80 constituting a shackle support handle by means of which the shackle may be secured in any suitable manner to an overhead conveyor assembly.

It will be further noted that there is supplied a circular disk 84 provided with a diametrical slot 86 therein by which it is engaged upon the upper portion of the support handle, with the portions 80 thereof being welded as at 88 to this disk.

Referring next to the holder component 64, it will be observed that the latter is of a generally rectangular configuration including a horizontal top member 90 together with a horizontal bottom member 92 and with a pair of vertically extending side members 94 each connected to the extremities of the top and bottom members. It will be observed that the side members 94, however, have their main central portions straight and parallel to each other but their upper portions as at 96 are slightly inclined relative to the central portion and their lower portions 98 are similarly inclined. Secured to the top member 90 as by welding 100 is a disk 102 likewise having a diametrically disposed central slot 104 therethrough and which disk is of the same construction, shape and size as the disk 84. This disk slidingly receives through the slot 104, which constitutes a guide opening therein, the U-shaped portion of the top member 66. Thus, the holder is slidingly and guidingly retained upon the support handle component of the support body for vertical sliding movement relative thereto.

The bottom member 92 is provided with U-shaped guide elements 106 thereon, see FIGURE 11, and secured thereto as by welding, see FIGURES 7 and 8 at 110. The guide members 106 thus provide guide openings 112 which slidingly and guidingly receive and retain therein the lower portion 76 of the side members 70. Thus, the two components are guidingly and slidingly engaged with each other at their upper and lower portions and at their respective top members and bottom members for limited relative sliding movement as will be apparent from a consideration of FIGURES 7 and 8.

Referring again to FIGURES 7 and 8 it will be observed that the support body 62 is further provided with a generally V-shaped member 116 which has a looped lower portion as at 118 with upwardly divergent sides 120 whose upper ends terminate in still further outwardly inclined top portions 122 which are joined by welding to the inclined mid-portions 78 of the support body side members 70.

Referring now specifically to FIGURES 7 and 8 it will be observed that there is provided a space between each side member 94 of the holder 64 and the adjacent side member portion 76 of the support body 62, this space comprising a pocket 130 which retains therein under the influence of gravity the extremity of a fowl such as the legs thereof. However, when relative sliding movement is imparted to the two components as by forcing the two disks 84 and 102 toward each other from the position of FIGURE 7 to that of FIGURE 8, it will be observed that the upward travel of the bottom member 92 of the holder relative to the side members of the support body increase the width of these pockets so that the extremity of the fowl may drop therefrom by gravity thus releasing the fowl.

Similarly, the V-shaped member 118 provides an additional pocket 132 which is adapted to receive the neck of a fowl therein. However, when the holder component moves upwardly with respect to the support body component, the bottom member 92 of the holder will move up along the additional pocket and lift the neck of the fowl so that the latter may drop by gravity out of the open upward end of this additional pocket.

It will be appreciated that in a similar manner in the embodiment of FIGURES 1–6, upward travel of the bottom member of the holder will likewise force the neck of the fowl from the additional pocket provided between the two guide projections 22.

Comparing the embodiment of FIGURE 1 with FIGURE 7 it will be observed that the former requires fewer parts and thus is simpler to construct and easier to assemble thereby decreasing the cost of the shackle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shackle for an overhead type poultry conveyor system consisting of a pair of cooperating components and comprising a vertically elongated support body and a holder mounted thereon for relative vertical movement, said body and holder including at least one pair of spaced, cooperating vertical surfaces defining therebetween a pocket for receiving and releasably retaining therebetween under the influence of gravity an extremity of a fowl, each of said body and holder having a transversely extending cross member at an upper and lower end, vertically extending projections on one of said cross members at one of said ends and the other cross member at said one of the ends having a guide opening therein slidably and guidingly receiving said projections.

2. The combination of claim 1 wherein each component consists of an open frame, including said cross members joined to a pair of generally vertical side walls, upper and lower guide means including said opening provided respectively upon the cross members of said frames and effecting a sliding, guiding and retaining engagement of said frames with each other.

3. The combination of claim 2 wherein said lower guide means consists of said guide opening in the cross member of one frame said vertically extending projections on the cross member of the other frame at the lower end being slidably received within said guide opening.

4. The combination of claim 3 wherein said upper guide means includes a vertically elongated portion comprising a shackle support handle on the cross member of one frame and extending both outwardly and inwardly of the latter.

5. The combination of claim 4 wherein at least one of said vertical surfaces has a lower portion inclined toward the other vertical surface and effecting a downwardly narrowing width of said pocket.

6. The combination of claim 1 including, a support handle fixedly secured to the cross member of said support body at the upper end and having a vertically slotted portion projecting into said support body, said cross member of said holder at the upper end being vertically slidably guided and retained in said slotted portion.

7. The combination of claim 6 wherein said cross member at the lower end of said support body has said vertically extending projections which diverge upwardly.

8. The combination of claim 1 wherein the cross member at the lower end of said holder has a laterally projecting guide with a second guide opening therethrough, said support body having a side member constituting one of said vertical surfaces received in the said second guide opening.

9. The combination of claim 8 wherein the cross member of said support body at the lower end includes upwardly divergent elements defining an additional pocket for receiving the extremity of a fowl, said holder cross member at the lower end being slidably engaged with and moving vertically of said additional pocket and ejecting a fowl extremity therefrom.

10. The combination of claim 1 wherein said vertically extending projections are upwardly divergent and constitute an additional upwardly opening pocket for receiving a poultry extremity, said other cross member at said one of the ends comprising a wall operating upon relative upward travel to empty said additional pocket.

References Cited by the Examiner

UNITED STATES PATENTS 3,044,109  7/1962  Wayne _____ 17—44.1
3,156,007  11/1964  Smith _____ 17—44.1

FOREIGN PATENTS 136,525  1/1962  U.S.S.R.

MELVIN D. REIN, *Primary Examiner.*

LUCIE H. LAUDENSLAGER, *Examiner.*